US005290140A

United States Patent [19]

Henderson et al.

[11] Patent Number: 5,290,140

[45] Date of Patent: Mar. 1, 1994

[54] CART FOR DIES WITH PNEUMATIC AND HYDRAULIC POWERED DEVICES

[75] Inventors: Robert E. Henderson, East Detroit; Richard L. Sanders, Mt. Clemens, both of Mich.

[73] Assignee: Chrysler Corporation, Highland Park, Mich.

[21] Appl. No.: 915,211

[22] Filed: Jul. 20, 1992

Related U.S. Application Data

[62] Division of Ser. No. 606,391, Oct. 31, 1990.

[51] Int. Cl.[5] .......... B60P 1/00; B60P 3/22; B60P 1/64

[52] U.S. Cl. .......... 414/509; 280/831; 180/306; 414/512

[58] Field of Search .......... 414/467, 478, 491–493, 414/501, 509, 526–536, 659, 661, 667–668, 671, 266–280, 241, 253, 259, 497, 525.1; 280/831; 180/302–305, 306

[56] References Cited

U.S. PATENT DOCUMENTS

| | | | |
|---|---|---|---|
| 2,781,926 | 2/1957 | Sights | 414/916 |
| 3,067,893 | 12/1962 | Grove | 414/661 |
| 3,150,787 | 9/1964 | Patrignani | 414/661 |
| 3,254,376 | 6/1966 | Burnett | 414/278 |
| 3,486,642 | 12/1969 | Plefka et al. | 414/497 |
| 4,514,133 | 4/1985 | Vercruysse | 414/512 |
| 4,705,445 | 11/1987 | Morita et al. | 414/280 |
| 5,032,054 | 7/1991 | Krsjicek | 414/661 |
| 5,104,277 | 4/1992 | Bullock | 414/280 |

FOREIGN PATENT DOCUMENTS

| | | | |
|---|---|---|---|
| 1031637 | 6/1966 | United Kingdom | 414/661 |

*Primary Examiner*—Michael S. Huppert
*Assistant Examiner*—R. B. Johnson
*Attorney, Agent, or Firm*—Kenneth H. MacLean

[57] ABSTRACT

A cart for transporting and moving die sets having an air powered/hydraulic fluid drive system to move the cart and die sets thereon. A hydraulic pump is driven by an air pressure powered motor and different hydraulic motors move the cart and move the die sets on the cart. A laterally movable die set transfer device is connected to one die set in one adjacent stamping press and to a second die set positioned on the cart to move the first die set from the one press and to move the second die set off the cart and into a second press.

4 Claims, 10 Drawing Sheets

FIG. 7
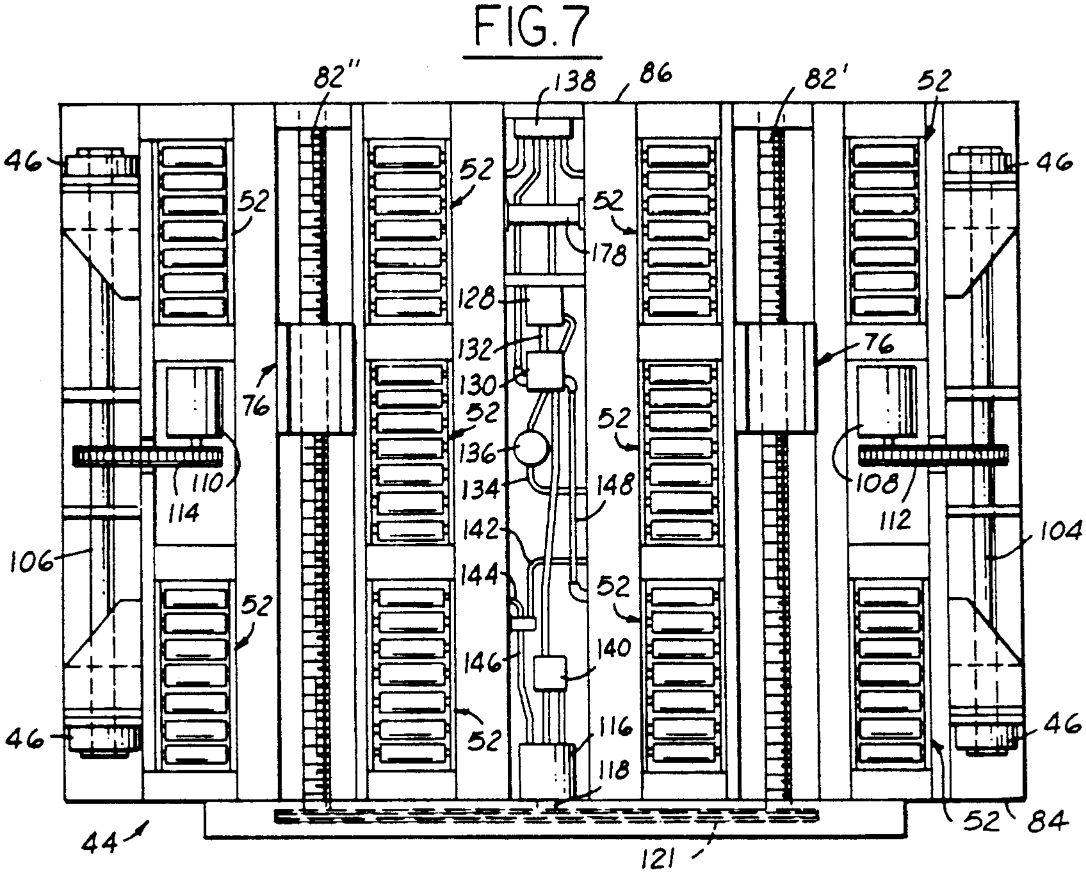
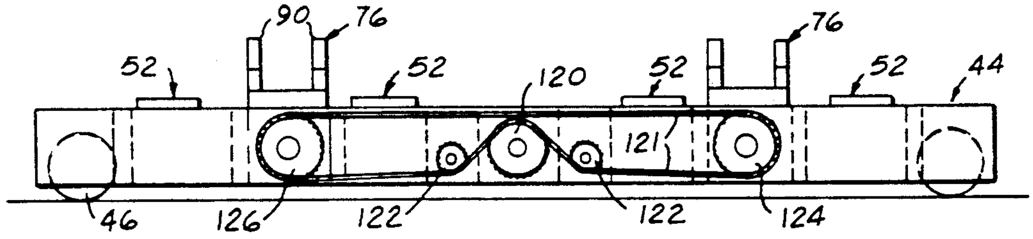
FIG. 8
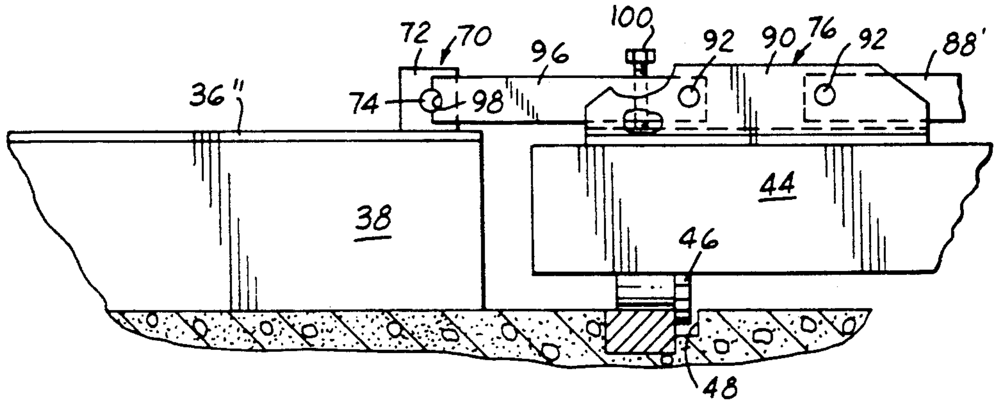
FIG. 10

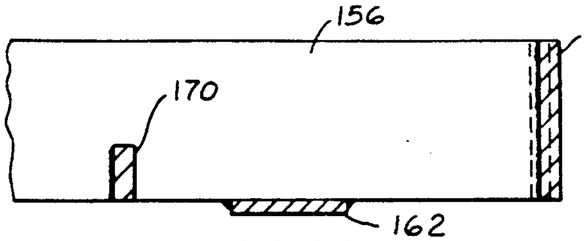
FIG. 14
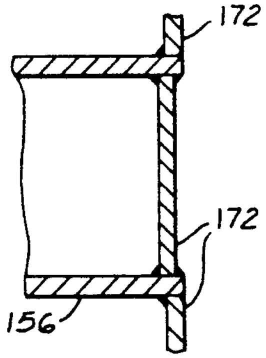
FIG. 15
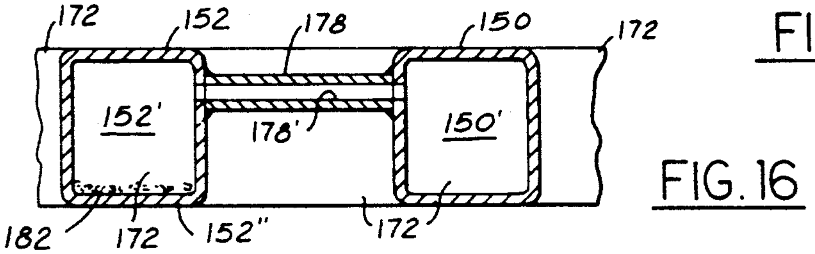
FIG. 16
FIG. 17
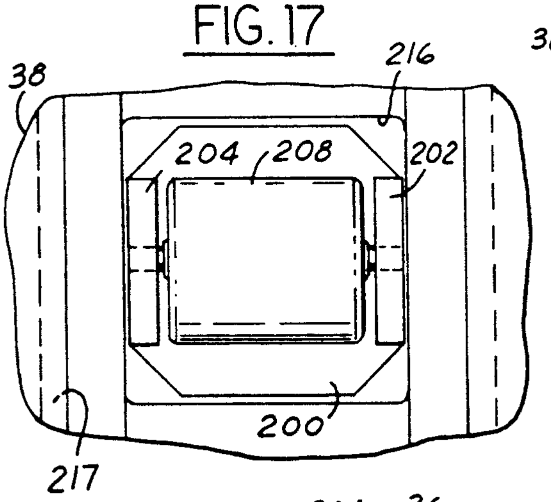
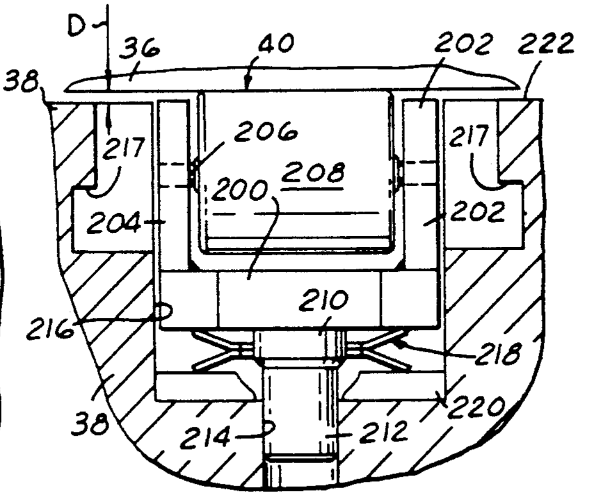
FIG. 18
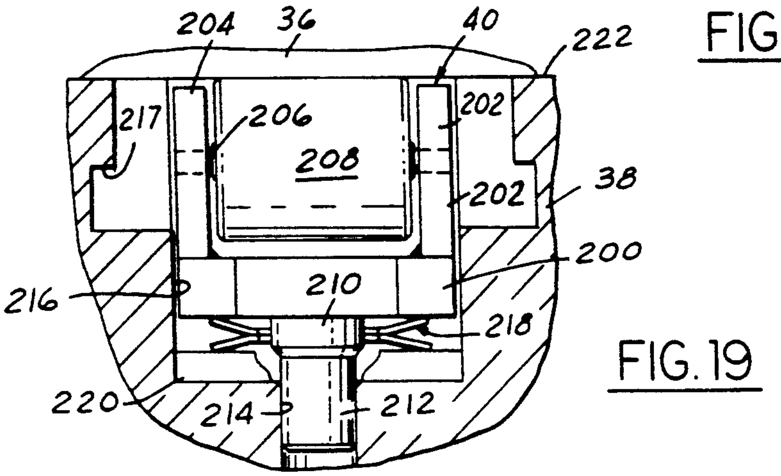
FIG. 19

CART FOR DIES WITH PNEUMATIC AND HYDRAULIC POWERED DEVICES

CROSS-REFERENCES TO RELATED APPLICATIONS

This application is a division of pending application Ser. No. 07/606,391, filed Oct. 31, 1990 now abandoned by the same inventors as in the present application.

BACKGROUND OF THE INVENTION

1. Field of the Invention

This application concerns a system and apparatus to efficiently and rapidly change die sets in a stamping press line which typically includes more than one stamping press. To form a stamped part, a sheet of steel is moved successively through several presses each utilizing a die set until a desired part is formed. For efficient operation of the press line, more than one different set of dies need to be available so that different parts can be produced at different times. When a new part needs to be made, a new set of dies must be substituted for the dies presently in the presses. The subject die change system and apparatus greatly facilitates this die change procedure.

2. Description of Related Art

The current practice in a stamping press rooms is to position a number of presses in a row. A part moves from one press to an adjacent press as it is progressively formed in to a finish vehicle body part, for example. An overhead travelling crane is typically used to move heavy equipment such as dies. The depending portions of the crane are selectively moved both along the row of presses and laterally therebetween. To change a die set in a press, the heavy die set is dragged horizontally out from each press. The crane is moved between the presses so that it can lift the die set and move it from between the presses. The die set is then taken to a storage area where a new die set is attached and moved back to the press. Typically, the new die set is positioned on a platform or the like so that it can be dragged into the press. This same procedure is repeated for each press. It can take many hours to change all the dies in a press line with six presses using the above described method.

SUMMARY OF THE INVENTION

This application discloses apparatus and a system to efficiently and rapidly change die sets in a row of stamping presses. Part of the die change operation begins even while the press line is operating to make a particular part. During this period, movable die carts are positioned in a remote prestaging area in front of a row of presses. Thus, the carts do not interfere with the movement of sheet metal parts from one press to another as the part is progressively stamped into a desired form. In the pre-staging area, die sets can be removed from the carts and new die sets can be placed on the carts.

The subject efficient die change system locates a first movable cart so that it can be positioned adjacent an outer end of one of the presses located at the end of the press line. Other carts are located so that they can each be positioned between the presses. A particularly efficient use of the above described die carts is to position them with the remote prestaging area located between two separate and parallel press lines. Thus, one group of die carts can be alternately moved in either direction with respect to either press line from the pre-staging area to a position adjacent a press.

When the carts are positioned in the pre-staging area and the press line is operating, the overhead crane can be used to remove a previously used die set from a cart. Then the crane can then be used to place a new die set onto the cart for subsequent use. When it is desired to change dies, each press is brought to a closed operative position which places the upper die down upon the lower die. The upper and lower dies are then be detached from the press and the press opened. Next, the die carts are moved into side by side relationship with the presses that the old die sets can be pulled from the presses onto the carts while simultaneously the new die sets are pushed into the presses for subsequent operative attachment.

Preferably, each cart has powered transport means to drag the old die set from a press onto the cart and to push the new die set from the cart into a press. Subsequently, the new dies are attached to the presses and the old die sets are moved by the carts to the remote area for pickup by the crane.

In addition to the powered transport means for moving die sets between the carts and the presses, the carts themselves are furnished with powered axle and wheel means so that they can be easily moved along tracks between the remote prestaging area to the presses. A desirable power source in the subject embodiment utilizes pressurized air fed to the cart through a flexible hose. The pressurized air operates an air driven motor which is directly connected to a hydraulic pump. The hydraulic pump takes oil from a reservoir and directs pressurized oil to hydraulic motors as directed by control valves. The control valves are activated by applications of air pressure through a control device which selectively routes air pressure signals to the control valves. A hydraulic motor is used to drive screw type devices for the pushing and pulling die set transport. Each of the cart's two wheeled axles are operatively connected to other hydraulic motors so the cart can be moved conveniently and easily, even with heavy die sets thereon.

Other features and objects of the invention will be more apparent by an examination of the drawings of a preferred embodiment and a reading of a detailed description of the preferred embodiment.

DESCRIPTION OF THE DRAWINGS

FIG. 7 is a planar view of the transporter cart like in FIG. 5 but with cover plates removed so that interior structure can be readily seen; and FIG. 8 is an elevational view of the transporter cart like in FIG. 6 but with cover plates removed so that axle drive structure can be seen; FIG. 10 is an enlarged elevational view like FIG. 9 but showing an alternate connecting structure between a cart and a die set after pushing a new die set into a press; FIG. 14 is an enlarged sectioned view taken along section line 14—14 in FIG. 11 and looking in the direction of the arrows; and FIG. 15 is a sectioned view taken along section line 15—15 in FIG. 13 and looking in the direction of the arrows; and FIG. 16 is a sectioned view taken along section line 16—16 in FIG. 11 and looking in the direction of the mows; and FIG. 17 is an enlarged planar top view of the roller type apparatus shown in FIG. 1 for supporting die sets in the presses; and FIG. 18 is an elevational and partially sectioned view of the roller apparatus shown in FIG. 17 with a die resting thereon during the die changing procedure as in FIG. 4; and FIG. 19 is an elevational view like FIG. 18 of the roller support apparatus after the lower die has been attached to the bed of the press.

DETAILED DESCRIPTION OF A PREFERRED EMBODIMENT

The Die Changing System

Figure 1:
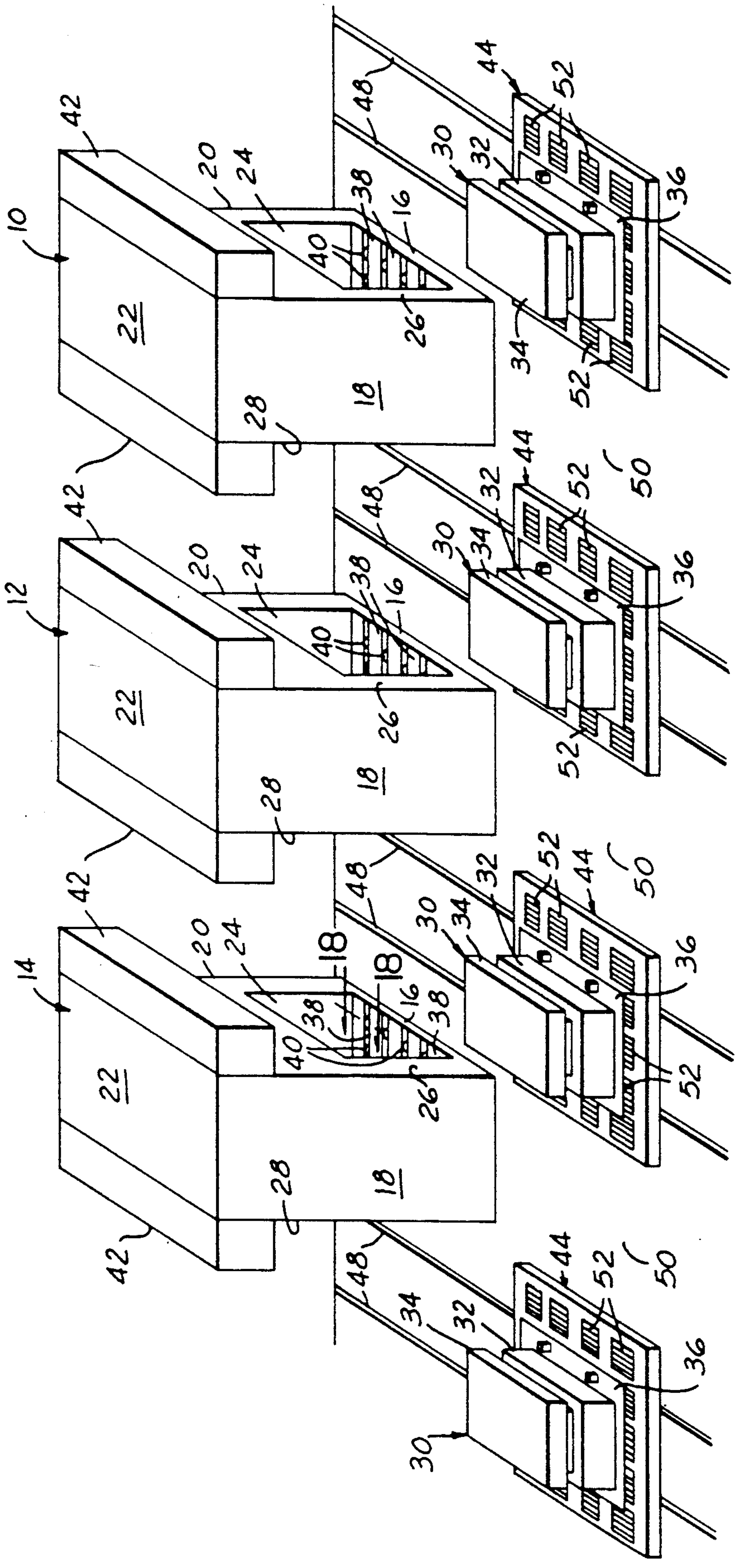
FIG. 1 is a perspective view of a portion of a press line showing several stamping presses and the subject die set changing apparatus including die set transporter carts and their arrangement relative to the presses during a prestaging mode of operation.

FIG. 1 illustrates a portion of a progressive stamping press line. Specifically, only three presses 10, 12, 14 are shown in FIG. 1 but the line can easily include six presses necessary to form a large and complicated vehicle body part. The presses are aligned in side by side relationship to form a press line. A sheet metal part begins as a flat piece at the right end of press 10. The sheet is formed between upper and lower dies of a die set in the press 10 and then transferred to press 12 where another die ret further forms the metal. Likewise, the piece is next transferred to press 14 to be further formed by the die set herein, and so on.

Basically, each press has a frame including a base or floor portion 16, a spaced pair of side columns 18 and 20, and a top or upper structure 22. Each press defines an opening 24 extending between front and rear faces or sides 26 and 28, respectively. Die sets 30, which include lower and upper dies 32 and 34, are used in the presses to progressively form the part as previously mentioned. Specifically, the lower die 32 of the die set 30 is attachably mounted on a flat support plate 36. In use, the plate 36 and die set 30 are placed into a press over parallel support skids or bolsters 38 formed by the floor or base 16 of the press.

The plate 36 and die set 30, used to form relatively large vehicle body panels, are very heavy. Some die sets weight up to 150 tons. To reduce the effort of installing the die sets caused by friction, the base or bolster of the press has a plurality of recesses formed therein in which roller devices 40 are mounted. Detailed specifics of this structure will be identified and discussed in more detail hereinafter.

Figure 3:
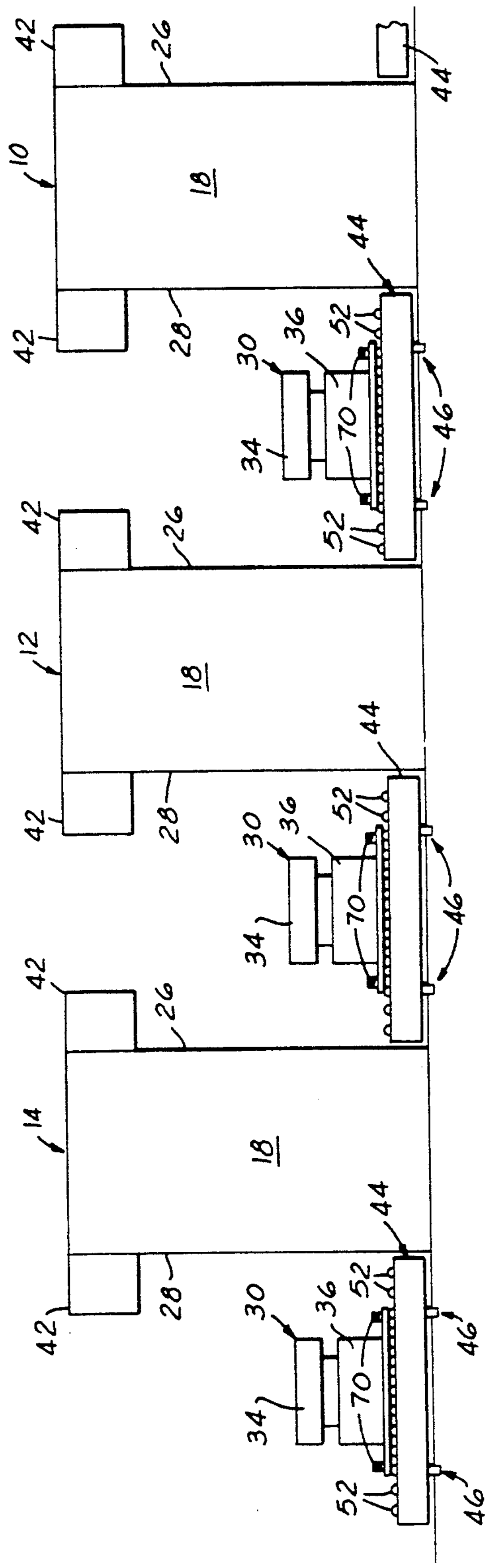
FIG. 3 is an elevational front view of a portion of the press line shown in FIG. 1 and showing the subject die changing apparatus including die transporter carts with new dies thereon.
Figure 4:
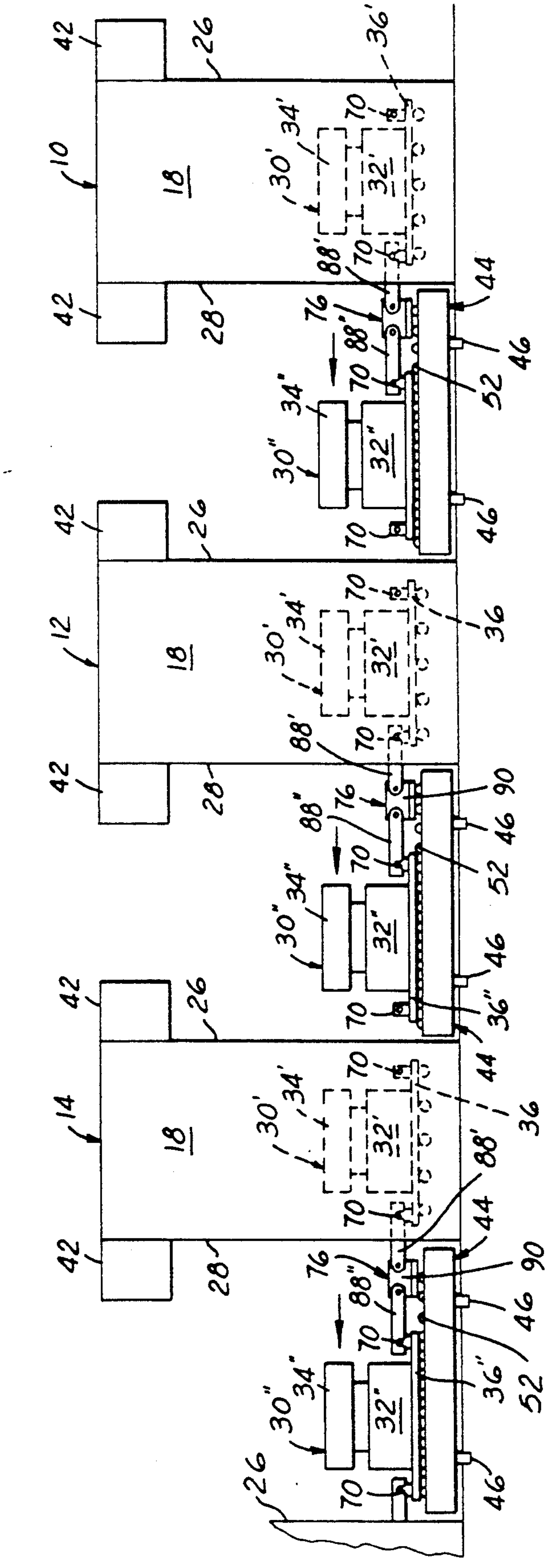
FIG. 4 is an elevational front view like FIG. 3 with the transporter carts positioned between presses during a die set changing procedure in which an old die set in a press is about to be pulled from a press and a new die set on a cart is about to be pushed into an adjacent press.

Earlier, it was explained that the general practice in the stamping art is to move each die sets with an overhead crane between a storage area and a loading position between and adjacent the presses. Levers, come-along or chain fall like devices are used to drag the old die sets out of the presses and push the new die sets into the presses. Normally, the die sets are temporarily supported upon a raised platform or the like. Many hours are typically required to change all the die sets of a six press line using this method. In addition to the relatively long time in which to finish a die change, quite often the movement of dies by overhead crane between the narrowly spaced presses will damage vulnerable external portions of the press such as electrical boxes, relays, etc. In addition, some press installations require equipment such as electric motors, for example, to be mounted on the side of the press rather than on top. This produces structure as schematically shown in FIGS. 1 and 3 and 4, and is identified by labels 42 in the drawings. The projecting structure 42 is of course easily damaged by lifting parts of the crane or the die set as it is moved.

Referring to FIGS. 1-4, the subject system and apparatus to change die sets is illustrated. It utilizes movable die carts 44 which are supported by wheels 46. The wheels 46 roll on tracks 48 along the press line floor. While the press line is operative and forming parts, the carts 44 are positioned in a remote or prestaging area 50. In this prestaging area, the carts 44 can be unloaded and loaded with die sets by an overhead crane (not illustrated) without likelihood of damage to the presses. Thus prior to shutting down the presses for a die set change, previously used dies can be unloaded from the carts and new dies can be loaded onto the carts for subsequent use.

Figure 2:
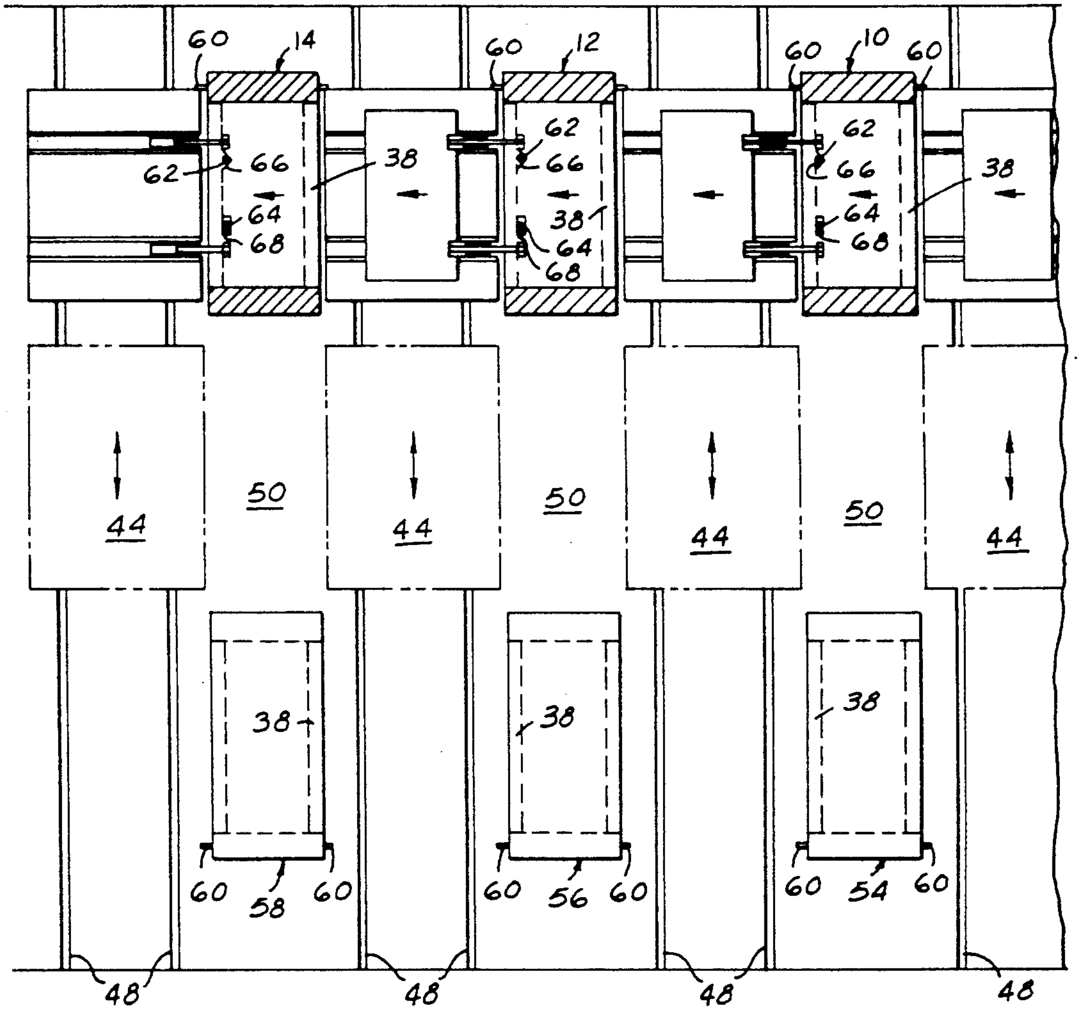
FIG. 2 is a planar view showing portions of two separate press lines with the subject die set changing apparatus positioned therebetween in the prestaging location so as to service both press lines.

When finally the press line is shut down for the die change, each cart 44 is moved along the tracks 48 into a side by side adjacent relationship with the sides faces 26, 28 of the presses as shown in FIGS. 2–4. The height of the die sets on the carts relative to the presses is predetermined so the die sets move substantially horizontally between the carts and the presses. To further facilitate movement of a die set between press and cart, a series of roller assemblies 52 are supported on the upper surface of the cart. These rollers will be better identified and described hereinafter.

Referring specifically to FIG. 2, it can be seen that the above described die cart system and apparatus easily services two parallel press lines. Specifically, presses 10, 12, 14 makeup a portion of a first press line. A portion of a second press line is represented by presses 54, 56 and 58. The tracks 48 pass adjacent and between the presses in a single press line and also extend between the first and second press lines. Thus, one cart can alternately service either press line.

Another convenient feature of the subject die changing system is apparent from FIG. 2. When the carts 44 are moved from the remote prestaging area 50 to spaces between two presses, stop means 60 are provided so that the carts 44 are located and correctly positioned relative to the presses in the direction between press sides 18, 20. Still further, the die support surface or bolster 38 of each press includes projecting guide means 62 and stop means 64. The means 62 and 64 interact, respectively, with a V-shaped notch or slot 66 and end surface 68 formed in the side of plate 36. The guide means 62 and slot 66 finally position the plate 36 in the press. Both the guide and stop means 62 and 64 interact with 66 and 68 to position the plate and die set in the direction between sides 26, 28. The means 62 and 64 may be in the form of upwardly extending pin members or the like. Of course, the members 62, 64 are removed once the die set is properly located and then attached to the press since the removal is necessary prior to pushing out the die set during a subsequent die change.

To best understand the mechanics of changing a die set using the subject equipment, reference is made to FIG. 4. The transporter carts 44 and die sets thereon are in a loading and unloading position with respect to the presses. The group of die sets to be replaced by a new group are labeled 30′ and the new group of die sets to be installed in the presses for subsequent use are labeled 30″. The respective mounting plates 36′ and 36″ of these die sets are each provided with pairs of upstanding attachment means or coffin hooks 70 positioned in pairs along opposite edges of the plates. For more details of the specific attachment structure, attention is directed to the enlarged view in FIG. 9. The attachment means 70 includes an upright post 72 extending from the mounting plate 36′. The post 72 carries a laterally extending cross pin 74.

The Die Set Transfer Apparatus

Figure 5:
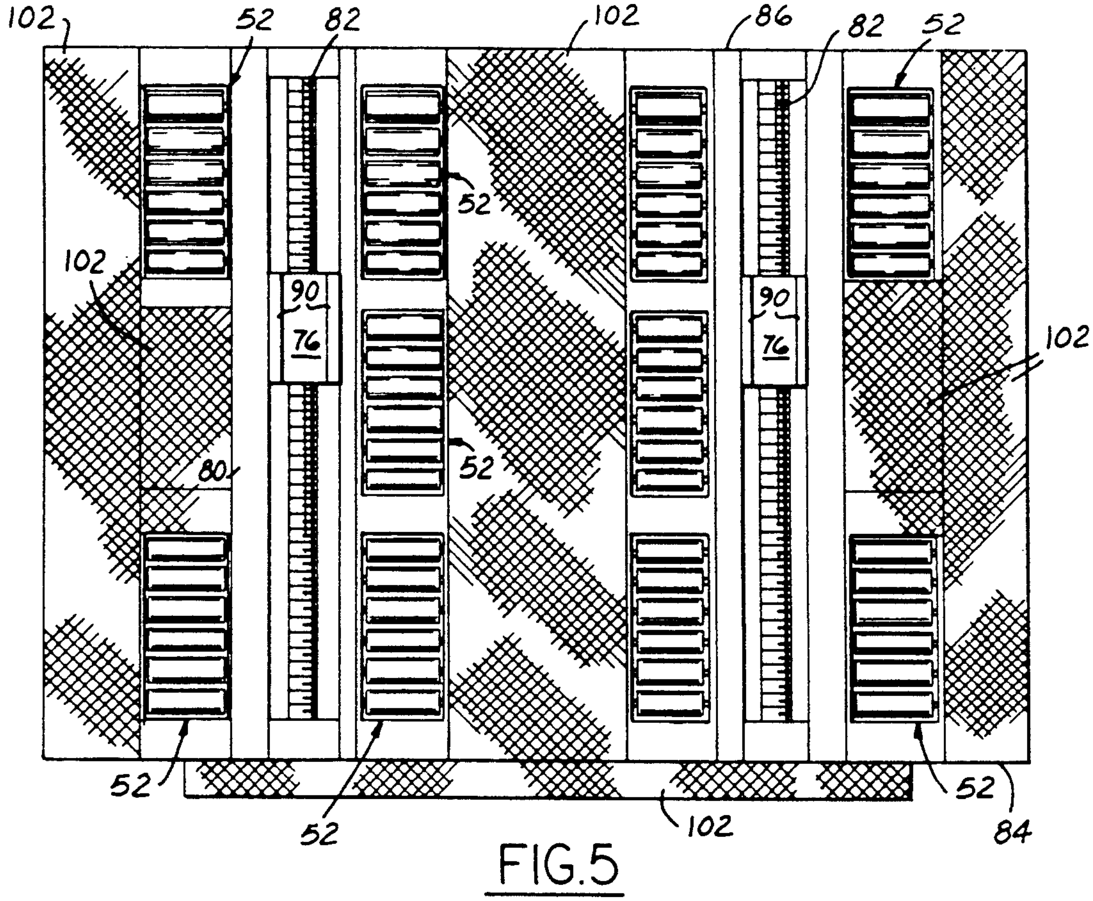
FIG. 5 is an enlarged planar top view of the subject die set change transporter cart.
Figure 6:
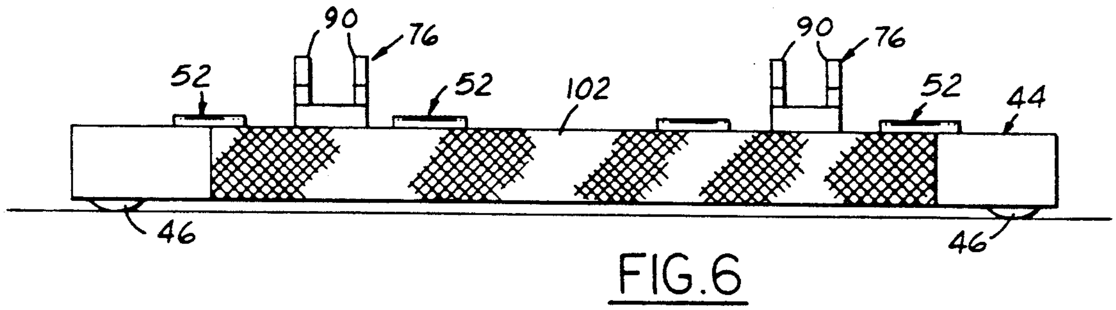
FIG. 6 is an enlarged elevational end view of the subject die change transporter cart showing its means of movable support relative to a track in the press line floor.
Figure 9:
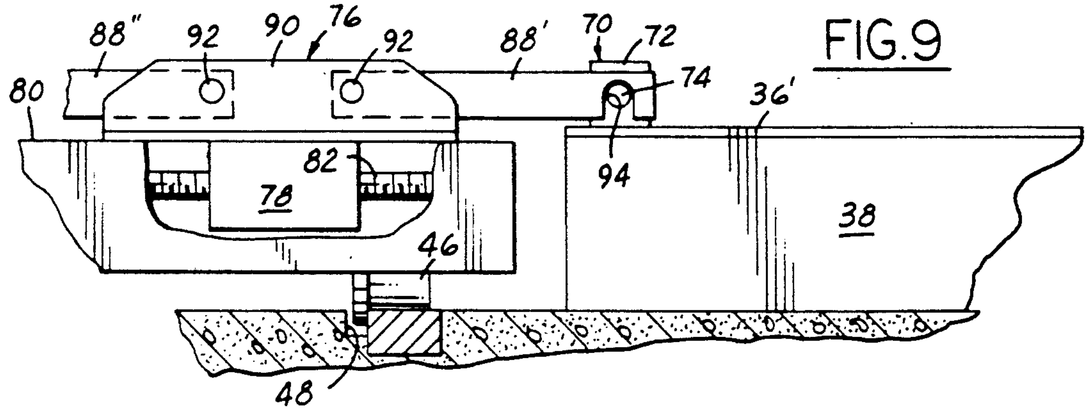
FIG. 9 is an enlarged elevational view of a portion of the transporter cart and a portion of an adjacent press showing cart support structure and connecting structure between the cart and an old die set prior to pulling the die set from the press onto the transporter cart.

With reference to FIGS. 5–6, each cart 44 includes a pair of spaced die transfer drives 76 which are used to move the dies on and off the cart. The old die set 30′ (in the press) can be pulled onto the cart 44 while the new die set 30″ is pushed from the cart into the next press. As best shown in FIG. 9, each die transfer drive 76 includes a bearing block or base portion 78 which extends below the upper surface 80 of the cart 44. An elongated shaft 82 extends laterally across the cart from one side 84 of the cart to the opposite side 86. The ends of each shaft 82 are supported to permit rotation thereof. The shaft 82 has a threaded or screw configuration and extends through bearing block 78 of a transfer drive 76. Likewise, block 78 has a threaded or screw configuration so that as shaft 82 rotates, the transfer drive 76 is moved laterally across the cart 44. For transmission of a maximum force, the shaft and block configuration would be in the form of a ball bearing drive arrangement in which steel ball bearings captured in the block 78 circulate in a spiral groove in the shaft 82. This type of drive is found in some automobile steering boxes.

Referring to FIG. 4, the die set plates 36′ and 36″ are connected to the transfer drives 76 by elongated link members 88′ and 88″. Each link has an aperture located near one end. The transfer drive 76 has a pair of upstanding portions or arms 90 which have apertures formed therethrough to receive a pin 92 which also extends through the aperture in to one end of the link. The second opposite end of the link 88′ has laterally extending slot 94 formed therein. By pivoting the link 88′ slightly, the slot may be dropped over the pin 74 of the attachment means 70. Thus, the mounting plate 36 is operatively connected to the transfer means. Subsequently, rotation of shafts 82 causes the transfer drives 76 to move across the cart 44 and simultaneously pull an old die set 30′ out of one press and push a new die set 30″ into a second press.

In FIG. 10, a variation of the link arm connection is shown. In the view, a new die set 36″ has just been pushed into a press by a link 96 with a semi-circular journal portion 98 formed in its end. The journal 98 engages the cross pin 74 to allow the arm to push the die set. With this arrangement, the link arm 96 does not need to be pivoted as before. A height adjustment means in the form of a threaded member-100 is provided so that the elevation of the link arm 96 and specifically the journal 98 can be set relative to the pin 74. Once adjusted, the journal portion 98 should line up with the cross pin 74.

The Cart

Obviously, a very important component of the afore-described system is the die cart 44. It must support a very heavy die set as well as move with the load from the remote area 50 to the presses. The cart 44 has already been defined generally with reference to FIGS. 5–6 and 9–10. Referring to FIGS. 7–8, removal of metal cover plates 102 from the cart in FIGS. 5–6, lays open the general layout and operative components of the cart 44. The cart has a unique frame or structure, the details of which will be identified and discussed hereinafter.

The opposite ends (right and left in FIGS. 7–8) of the cart support axles 104 and 106 respectively. Wheels 46 are mounted on the ends of the axles 104, 106 so that the cart can be easily moved along the tracks 48. Hydraulic driven or powered motors 108 and 110 are operatively connected to the axles 104, 106 by chain link drives 112 and 114, respectively. When pressurized oil is applied to motors 108, 110 the respective axles and wheels are rotated, thus moving the cart 44. Motors 108 and 110 are readily reversible simply by reversing the flow direction. The oil connections and direction of flow are controlled by a valve which will be discussed hereinafter.

As previously explained, the die transfer drives 76 are moved laterally from one side 84 to another side 86 of the cart 44 by rotation of the threaded shafts 82. Since it is desirable to move the die set evenly and squarely on the cart, the shafts 82 must be rotated simultaneously. Therefore, a single hydraulic motor 116 is used to drive the shafts. A shaft 118 of motor 116 is connected to and rotates a gear 120. A link chain 121 extends about gear 120 and past idler gears 122 and then about gears 124 and 126. Gear 124 is connected to the end of the rightward shaft 82' in FIG. 7. Gear 126 is attached to the leftward shaft 82" in FIG. 7. Thus, applying pressurized oil to the motor 116 will produce synchronous motion of the two die transfer drives 76. Obviously, like motors 108 and 110, hydraulic motor 116 is reversible by reversing the fluid flow by a control valve as will be better explained hereinafter.

Power for the Cart

An air powered or driven motor 128 and a hydraulic pump 130 are shown in FIG. 7. Motor 128 and pump 130 are directly connected by a shaft 132 so that motor 128 drives pump 130. As so far explained, there is no electrical connections to the cart 44. The sole power for the cart 44 and the air motor 128 which generates pressurized oil for the other motors is a pressurized air hose (not visible in the drawings). Specifically, the pressurized air is routed to the central portion of the cart to motor 128 by a conduit 134. An air filter 136 prevents passage of dirt and moisture to the air motor 128.

The above referenced hydraulic pump 130 selectively supplies pressurized oil to the hydraulic motors 108, 110 and 116 through air pressure operated control valves 138 and 140 in the embodiment generally shown in FIG. 7. Control valve 138 directs the flow of pressurized oil to the axle motors 108 and 110. It has selective operative modes to change the flow direction of pressurized oil to motors 108, 110 so that the cart will move in opposite directions as needed. Likewise, the other control valve 140 has selective operative modes to change the flow direction to permit motor 116 to move the pair of transfer devices 76 in opposite lateral directions across the cart 44. In FIG. 7, oil returns from the motors 108, 110 and 116 through conduits 142, 144, 146, respectively. The oil enters a hydraulic reservoir formed in hollow beans of the cart frame as will be described in more detail hereinafter. Hydraulic pump 130 withdraws the stored oil in the reservoir means through a conduit 148.

Structural Frame of the Cart

The cart obviously must have great rigidity and strength in order to support very heavy die sets. The cart's strength is achieved through the particular frame structure best shown in FIGS. 11-15. In the lateral direction from side 84 to side 861, the central portion of the frame has continuous tubular steel beams 150, 152. In the illustrated preferred embodiment, these beams are eight inches square and one half inch in wall thickness. On both sides of the cart outward from beams 150 and 152 are three continuous solid steel beams 156, 158 and 160 (two by eight inches).

Figure 11:
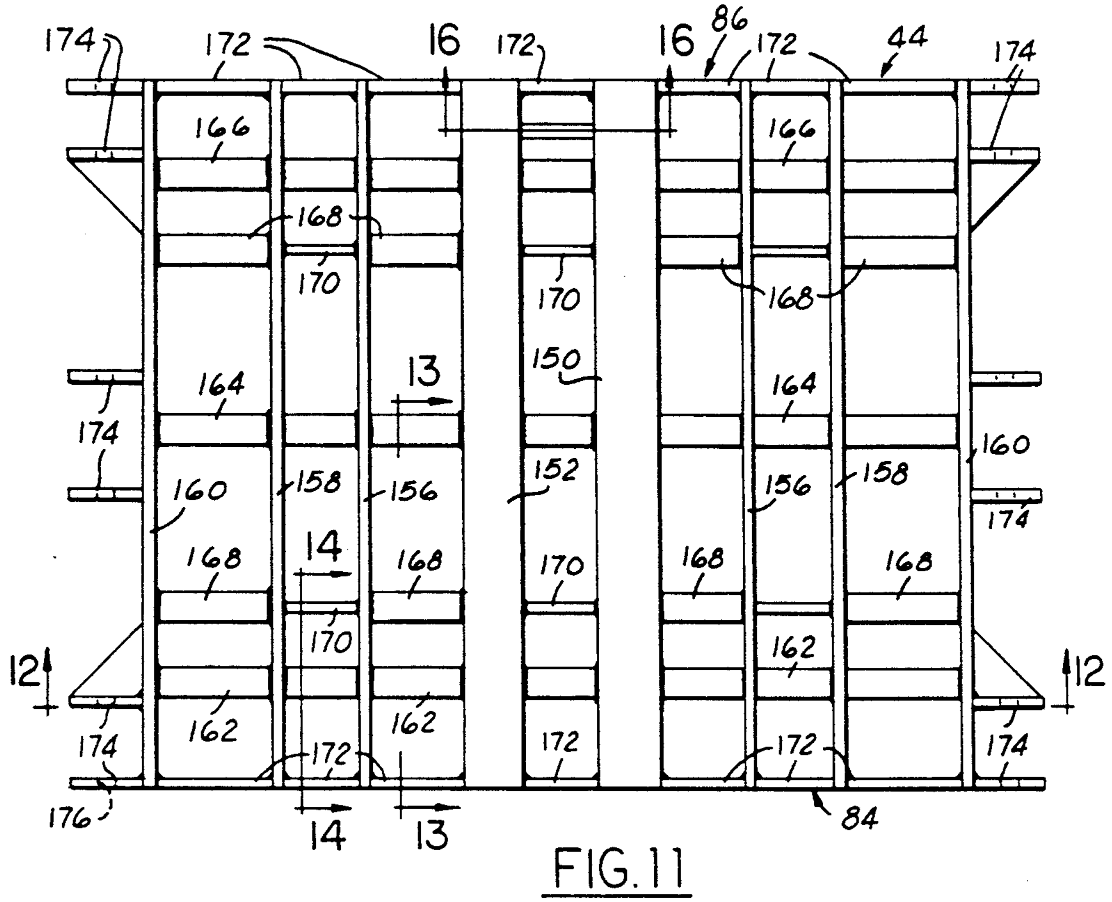
FIG. 11 is an enlarged planar view like FIG. 5 but with structure removed to reveal the transporter cart's frame structure.
Figure 12:
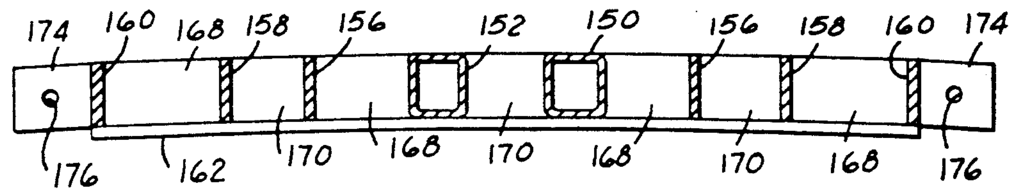
FIG. 12 is an enlarged end sectioned view of the frame structure taken along section lines 12—12 in FIG. 11 and looking in the direction of the arrows and revealing a significant arched preloaded configuration which has been exaggerated for clarity.
Figure 13:
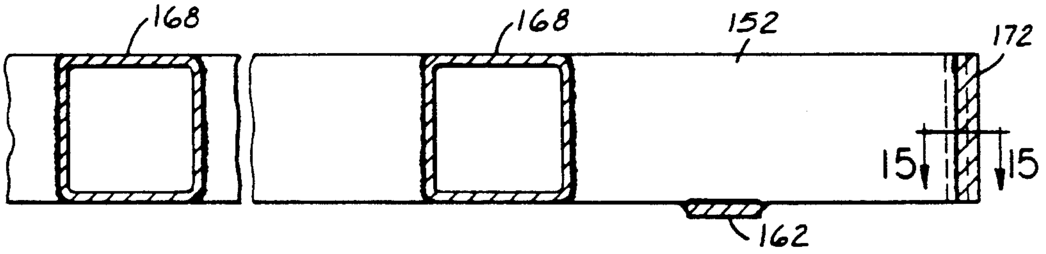
FIG. 13 is an enlarged partial sectioned view taken along section line 13—13 in FIG. 11 and looking in the direction of the arrows.

The frame is strengthened in the end to end direction (normal to the beams 150, 152) by three continuous solid steel beams 162, 164 and 166 having a two by ten inch cross section. The relatively flat beams 162, 164 and 166 extend beneath beams 150, 152, 156, 158 and 160 as shown in FIGS. 11 and 12. The beams are securely attached at their crossing junctions by weldments. Also in the end to end direction, the frame is strengthened by two non-continuous mid-beaus consisting of: short pieces 168 of eight by eight tubular steel between beams 150 and 156 and between beams 152 and 156 and between beams 158 and 160 (both sides); and short pieces 170 of solid steel extending between beams 150 and 152 between beams 156 and 158. Pieces 168 and 170 are securely welded to the other beams to complete the formation of a very firm structure. The configuration of the solid short pieces 170 are selected to allow lateral clearance for the die transfer drives as seen in FIG. 14 and to allow communication between various components located between the beams 1501, 152 as seen in FIG. 7. Finally, the frame is completed along the opposite sides 84, 86 by short end pieces 172 consisting of two by eight solid steel. The pieces 172 are welded between the various continuous beams 150, 152, 156, 158 and 160 as seen in FIG. 15.

The ends of the frame is completed by attaching stub beams 174 to the outer beams 160. The stub beams extend outwardly and normally from the continuous beams 160 and are of two by eight solid steel. The center four stub beams have openings 176 therethrough for receiving axles 104 and 106.

With reference to FIG. 12, an important structural feature is shown. Note that the frame has an arched configuration in the end to end direction between the axle supporting apertures 176. It can be seen that the continuous solid beams 162, 164 and 166 which extend beneath the other beams are curved or arched upward. Thus, the mid-point is higher than the ends when the frame structure is welded together. Of course, for clarity, the arched configuration is greatly exaggerated in FIG. 12. In the preferred embodiment described above, capable of supporting a 150 ton die set, the mid-point of the frame is arched upward about one half inch with respect to the ends and the end to end distance which is about 152 inches. Obviously then, the small pieces 168, 170 and 172 are not perfectly rectangular so that they conform to the arched structure. Resultantly, when a cart is loaded with a heavy die set, the mid-portion of the cart is distorted downward to form a flatter configuration.

The Cart's Hydraulic Reservoir

Referring to FIGS. 13-16, the views show enlargements of various beams identified in previous paragraphs. Earlier, it was mentioned that tubular frame members form oil reservoirs for the hydraulic system. In the embodiment shown, the interiors of the tubular beams 150 and 152 form this reservoir. In FIG. 16, the cross sections of beams 150, 152 reveal interiors 150' and 152' capable of storing a significant amount of oil. The return oil from the various hydraulic motors 108, 110 and 116 flows into the interior 152' as previously explained. The oil then passes from beam interior 152' to interior 150' through a transfer pipe or conduit 178 defining a passage 178'. The oil is subsequently withdrawn from interior 150' through a conduit 148 (shown in FIG. 7). Note in FIG. 16 that the transfer conduit 178 is elevated with respect to the bottom wall 152" of the beams. This is so solid contaminants can settle out of the oil and collect above wall 152" in interior 152' as identified in FIG. 16 by label 182.

Apparatus to Adjust Die Height on Cart

Figure 20:
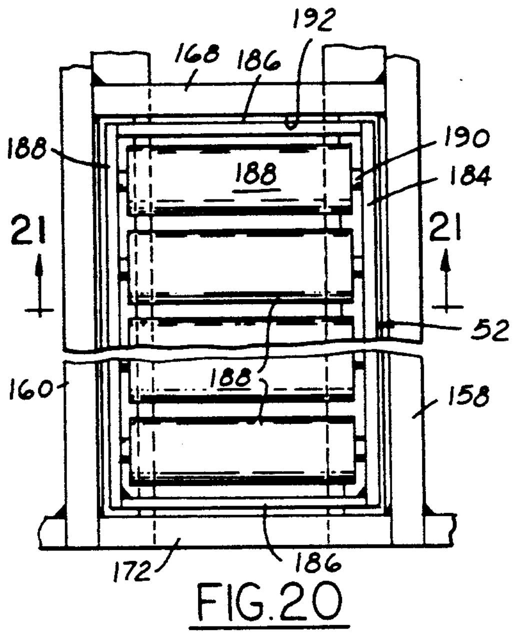
FIG. 20 is an enlarged planar top view of a replaceable roller assembly for a die cart as shown in FIGS. 5 and 7.
Figure 21:
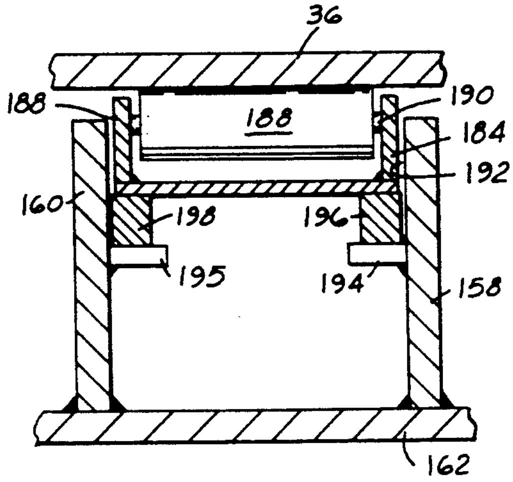
FIG. 21 is a sectioned view of the roller assembly taken along section line 21—21 in FIG. 20 and looking in the direction of the arrows and showing the means to adjust the elevation of the rollers.

A feature of the cart 44 is the provision of roller assemblies 52 on which the heavy die set and plate are supported. To greatly reduce the effort required to move the die set between press and cart, it is important that the plane of the plate 36 be substantially coplanar with the bolster 38 of the press. Reference is made to FIGS. 20 and 21 which best disclose adjustable support for the roller assemblies 52 relative to the cart 44. The support assembly 52 includes a frame with side members 184 and end members 186. The frame supports a plurality of cylindrical roller members 188 which turn on shafts 190 which extend between the side members 184.

As best seen in FIG. 20, the support frame drops into a rectilinear space or recess 192 which in one direction may be formed between beams 158 and 160 and in another direction is formed between beam piece 168 and end member 172 for example. Referring now to FIG. 21, the roller assembly 51 is support on members 194, 195 which are welded to the sides of continuous beams 158, 160, for example. The elevation or vertical height of the assembly 52 relative to the top of the cart or bolster 38 is determined by the dimension of spacer beam members 196, 198 which are positioned between supports 194, 195 and the frame of assembly 52. If more or less height of assembly 52 is respectively desired, spacers (not shown) can be added or a thinner beam can be substituted.

Apparatus to Support a Die Set in the Press

As with the previously disclosed apparatus to facilitate movement of a heavy die set on the cart, it is desirable to reduce friction between a die set support plate 36 and the support surface of the press when the die set is moved into or out of the press over the bolster 38. Previously, the die set directly contacted the bolster and was dragged thereacross. As the lower die is cast iron and the bolster is steel, the materials moved relatively easily over one another and a dragging operation was feasible. However, in the subject system and apparatus, plate 36 is of steel as is the bolster. Since sliding steel over steel under heavy engaging pressures generates large frictional forces and galling, the former dragging or sliding procedure is no longer feasible. Therefore, the preferred embodiment of the die change system includes a friction reducing apparatus.

As previously noted with reference to FIG. 1, the press's bolster or support surface 38 includes several recesses. Each recess houses a roller support assembly 40 for supporting a die set. For details of a typical roller support assembly, attention is directed to FIGS. 17-19. These views disclose a base member 200 with a pair of upstanding, spaced arm portions 202, 204 attached thereto (preferably by welding). Each spaced arm portion supports an end of a roller shaft 206. Shaft 206 in turn supports a cylindrical roller 208 thereabout. When a die set is being moved into or out of a press, roller 208 engages and rotates relative to the underside of the die set mounting plate 36 and supports the plate 36 above the bolster 38.

A depending stepped shaft extends from the base member 200 of assembly 40. The stepped shaft has a larger diameter portion 210 adjacent base 200 and a lower smaller diameter portion 212. The shaft portion 212 extends into a correspondingly sized bore 214 in the bolster or base 38 of the press. This permits the assembly to move vertically and to allow the plate 36 to be moved downward against the bolster as in FIG. 19 when the plate is bolted to the press during operation thereof.

FIGS. 17, 18 and 19 also reveal details of a typical recess 216 formed in the bolster 38 of the press. A recess-216 is most conveniently formed between the usually provided T-shaped slots 217 (upside down) typically found in base of the press. The slots 217 are typically used to secure the heads of bolt like fasteners (not shown) which extend upwardly to engage a nut portion of the fastener to secure the mounting plate 36 to the base of the press. The assembly's base 200 is sized and configured to easily fit into the recess 216. A side by side or dual Belleville type washer spring 218 is located in a space formed beneath the base 200. An annular spacer member 220 is located between the spring 218 and the lower surface or bottom wall of the recess 216. Spring 218 is sufficiently stiff to support the weight of the die set 30 and plate 36 above the upper surface 222 of the bolster 38 as shown in FIG. 18. The thickness of spacer 220 can be varied to provide desired spacing of the plate 36 above the bolster surface 222 as discussed in the next paragraph.

FIG. 18 shows the configuration and orientation of the roller assembly during a die changing procedure when the die set is being moved into or out of a press. Note the slight spacing or distance D between the underside of the plate 36 and the upper surface of the bolster 38. For satisfactory friction reduction, the distance D can be as little as 0.07 of an inch.

Once a die set is in moved into position in the press, the heads of bolt type fasteners are engaged into the T-shaped slots 217 and nut type fasteners are used to secure the plate .36 to the bolster 38. Sufficient force is generated to compress the springs 218 and move the lower surface of the plate 36 against the upper surface 222 of the bolster as shown in FIG. 19.

Detailed Fluid Power and Air Control System

Figure 22:
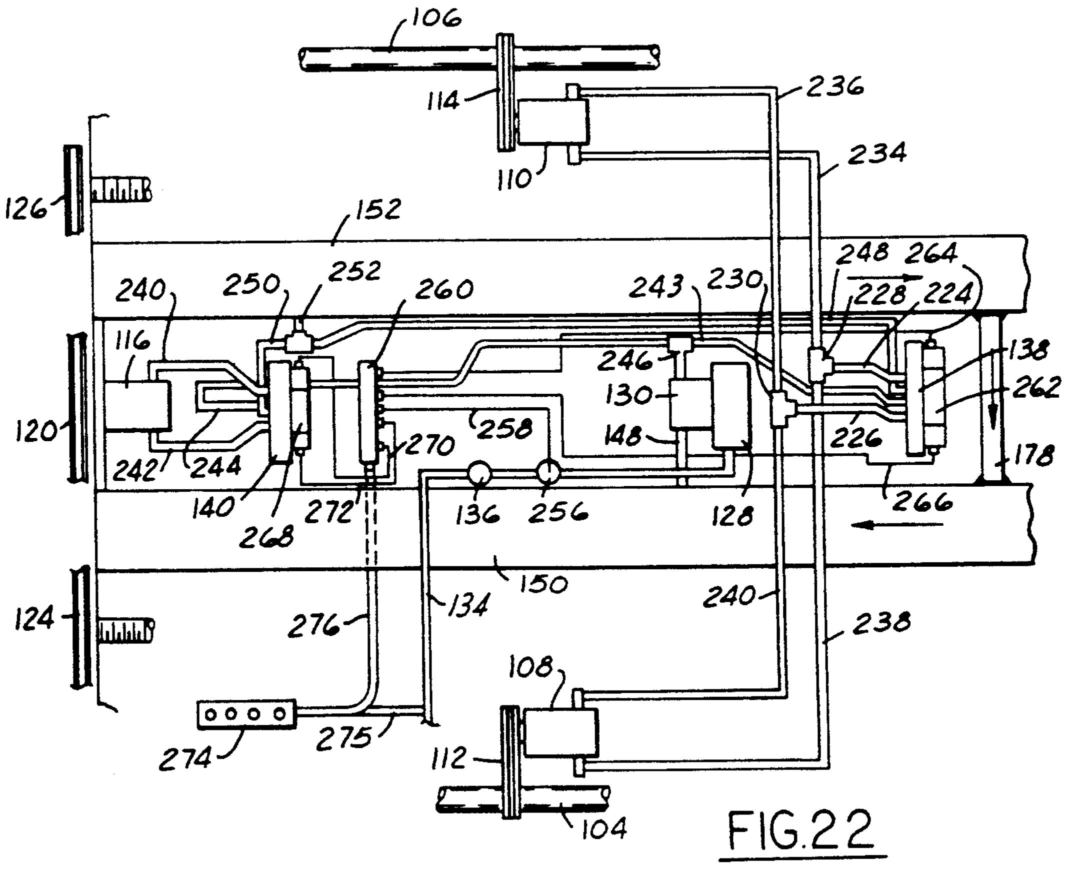
FIG. 22 is a planar view of the air and hydraulic mechanisms positioned between beams of the cart frame.
Figure 23:
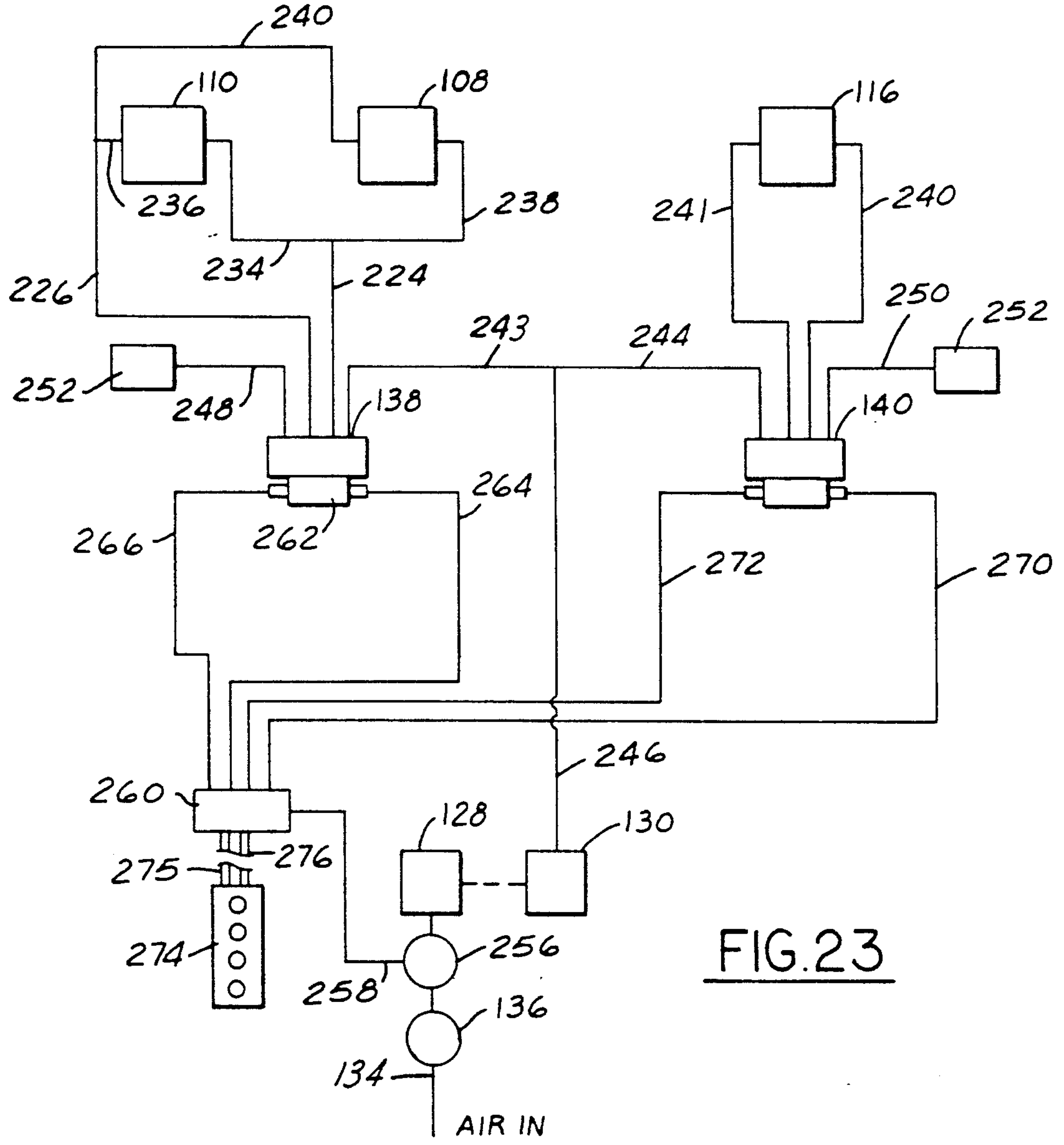
FIG. 23 is a schematic view of the air and hydraulic system with the air signaling control system.

Earlier, the air power and hydraulic oil drive system and components were briefly discussed. More details of a preferred system are disclosed in FIGS. 22 and 23. The views show the previously identified hydraulic motors 108, 110 for rotating the axles 104, 106 and thus moving the cart. The motors are connected to an oil flow control valve 138 by: a pair of conduits 224, 226; fittings 228, 230; and conduits 234, 236, 238 and 240.

The previously identified hydraulic motor 116 which powers the die transfer devices 76 is connected to oil flow control valve 140 by conduits 242, 240.

Each of the oil control valves 138, 140 are fluidly connected respectively by conduits 243, 244 to the outlet 246 of hydraulic oil pump 130. Each of the valves 138 and 140 also has a fluid drain conduit 248, 250 which is connected to an inlet fitting 252 to the interior 152' (see FIG. 16) of beam 152 which serves as part of a hydraulic reservoir. From a previous explanation, it can be recalled that the hydraulic oil in interior 152' of beam 152 passes into interior 150' of beam 150 through the transfer conduit or pipe 178. The inlet 148 of the hydraulic pump 130 is operatively connected to the interior 150' of beam 150.

Internally, the oil control valves 138, 140 each have a movable valving part to selectively connect various outlets with the inlet. This places the valve in one of four modes as follows: a mode blocking pressurized oil flow; a mode directing oil flow to a motor in one direction to produce rotation in one direction; a mode directing oil flow to a motor-in an opposite direction to produce rotation in the opposite direction; a mode, to drain oil from the motors and conduits back into the reservoir.

It was previously explained that the hydraulic pump 130 is driven by the air motor 128. Pressurized air is directed to the air motor 128 by a line 134. A filter 136 is placed between the air source and the motor 128. Control of air pressure to the, motor 128 (on-off) is by an air valve 256. The valve 256 is normally maintained in a closed mode but opens in response to a pressurized air signal through an air signal line 258. The air line 258 is connected to a combination air junction and valve 260.

The air junction valve 260 is used to selectively send pressurized air signals to other devices. Hydraulic control valve 138 responds to signals communicated to an air pressure powered control device 262 through air signal lines 264, 266. Hydraulic control valve 140 responds to signals communicated to an air pressure powered control device 268 through air signal lines 270, 272. Signals are selectively emitted by the air junction valve 260 in response to manual operation of a four button control 274. Control 274 regulates the introduction of pressurized air to the junction valve 260 so as to selectively direct the necessary signals to the devices 256, 262 and 268. Control 274 is connected to air line 134 and junction valve 260 by air transmission means 275 and 276. The four buttons on the control 274 control the following functions: move the cart in one direction; move the cart in the opposite direction; move the die set transfer drive 76 in one direction; and move the drive 76 in the opposite direction.

While a single embodiment of the apparatus and system has been illustrated and described, modifications thereto are contemplated which would not fall outside the scope of the invention as claimed hereinafter.

What is claimed is as follows:

1. A cart with die set supporting surfaces, the cart having opposite sides, said surfaces supporting a heavy die set so as to permit movement of the die set between the opposite sides, comprising: a hydraulic pump means mounted on the cart and serving as a source of hydraulic pressure; a hydraulic reservoir in fluid communication with the pump means, means for driving the hydraulic pump; a hydraulic motor; at least one horizontally translating die set transfer device capable of movement across the cart between the opposite sides; an elongated screw member associated with each die set transfer device, the screw member extending across the cart between the opposite sides and supported at its ends for rotative motion; bearing means connecting the die set transfer device and the screw member so that rotation of the screw member causes movement of the die set transfer device; spaced means pivotally mounted on said bearing means for engaging spaced die sets for simultaneously moving the die sets; means operatively connecting the hydraulic motor and the screw member to selectively rotate the screw member whereby activation of the hydraulic motor produces rotation of the screw member and causes movement of the die set transfer device so that a die set engaged by said spaced means is resultantly moved from one side of the cart to an opposite side in a sliding manner over the die set supporting surfaces.

2. The cart set forth in claim 1 including a motor powered by pressurized air; means operatively connecting the motor powered by pressurized air to the hydraulic pump so that operation of the motor powered by pressurized air drives the hydraulic motor and generates pressurized hydraulic fluid; hydraulic valving means responsive to an air pressure signal for controlling the application of the pressurized hydraulic fluid to the hydraulic motor to cause selective movement of the die set transfer device relative to the cart, the hydraulic valving means having different operation modes including: a first mode blocking transmission of pressurized hydraulic fluid to the hydraulic motor; a second mode directing pressurized hydraulic fluid to turn the hydraulic motor in one direction; and a third mode directing pressurized hydraulic fluid to turn the hydraulic motor in a second direction opposite to said one direction whereby the associated die transfer device can be selectively moved in opposite directions; a manually activated control for selectively applying air pressure signals to the hydraulic valving means to thereby select alternate modes causing desired movement of a die set laterally across the horizontal surface of the cart.

3. A movable die set cart with a power apparatus and system effecting selective cart movements and die movements on the cart by the application of a pressurized hydraulic fluid system, the power apparatus and system being self-contained on the cart and hydraulic fluid pressure being generated by application of pressurized air, comprising: a die cart which includes a wheeled frame; the wheeled cart frame constructed to form a hydraulic reservoir for the power apparatus and system; the wheeled frame supporting a hydraulic fluid pump in fluid communication with the reservoir for pressurizing hydraulic fluid; the wheeled frame also supporting a first hydraulic motor in selective fluid communication with the hydraulic fluid pump and being operative to selectively effect cart movement when pressurized hydraulic fluid is applied thereto; the wheeled frame further supporting a second hydraulic motor in selective fluid communication with the hydraulic fluid pump and being operative to selectively effect die movements relative to the wheeled frame when pressurized hydraulic fluid is applied thereto; the wheeled frame supporting an air powered motor connected to the hydraulic pump for powering the pump and generating pressurized hydraulic fluid when pressurized air is supplied to the air powered motor; a remotely controlled valve responsive to a pressurized air signal; the remotely controlled valve having alternate off and on modes, the off mode blocking flow of pressurized air to the air powered motor and the one mode passing pressurized air to the air powered motor whereby in the on mode the air powered motor is operative to drive the hydraulic pump and generate pressurized hydraulic fluid; manually activated control means for selectively directing an air pressure signal to the remotely controlled valve to place it in either the on or the off mode; valve means responsive to pressurized air signal to selectively place the first and second hydraulic motors in fluid communication with the hydraulic fluid pump.

4. The movable die set cart as set forth in claim 3 wherein said valve means comprises: a second remotely controlled valve placed between the hydraulic fluid pump and the first hydraulic motor and responsive to a pressurized air signal; a third remotely controlled valve placed between the hydraulic fluid pump and the second hydraulic motor and responsive to a pressurized air signal; the valves having alternate modes to block flow of hydraulic fluid to a respective hydraulic motor, transmit flow of hydraulic fluid in one flow direction for operation of the respective hydraulic motor in a first direction, transmit flow of hydraulic fluid in a second direction opposite to said first direction for operation of the respective hydraulic motor in a second direction; means operative to receive pressurized air signals from said manually activated control means to selectively actuate the modes of the second and third remotely controlled valves.

* * * * *